(12) United States Patent
Xie et al.

(10) Patent No.: US 9,644,646 B2
(45) Date of Patent: May 9, 2017

(54) MULTIPLE-STAGED FLUID OPERATED ACTUATOR

(75) Inventors: Zugang Xie, Shanghai (CN); Jiqiang Chen, Shanghai (CN)

(73) Assignee: Norgren, Inc., Littleton, CO (US)

( * ) Notice: Subject to any disclaimer, the term of this patent is extended or adjusted under 35 U.S.C. 154(b) by 672 days.

(21) Appl. No.: 13/982,834

(22) PCT Filed: Feb. 18, 2011

(86) PCT No.: PCT/CN2011/000253

§ 371 (c)(1),
(2), (4) Date: Jul. 31, 2013

(87) PCT Pub. No.: WO2012/109769

PCT Pub. Date: Aug. 23, 2012

(65) Prior Publication Data

US 2013/0312398 A1    Nov. 28, 2013

(51) Int. Cl.
*F15B 15/14*     (2006.01)
*B29C 43/02*     (2006.01)

(52) U.S. Cl.
CPC .......... *F15B 15/1409* (2013.01); *F15B 15/14* (2013.01); *F15B 15/149* (2013.01)

(58) Field of Classification Search
CPC ..... B29C 49/06; B29C 49/58; B29C 49/0073; B29C 49/70; B29C 49/12; F16J 1/005;
(Continued)

(56) References Cited

U.S. PATENT DOCUMENTS 4,638,718 A * 1/1987 Nakamura ............. H01H 33/34
91/178
5,125,326 A * 6/1992 Sarcona ................ F15B 11/122
74/364
(Continued)

FOREIGN PATENT DOCUMENTS

CN     1892051 A    1/2007
CN   101284418 A   10/2008
(Continued)

OTHER PUBLICATIONS

Series BCZ Nozzle Cylinders: for the Plastic Bottle Blowing Industry (PHD, 2007 [online catalog] [retrieved Oct. 29, 2015] <URL: http://web.archive.org/web/20070730223519/http://catalog.phdinc.com/series.asp?pid=133>).*

*Primary Examiner* — F. Daniel Lopez
*Assistant Examiner* — Richard Drake
(74) *Attorney, Agent, or Firm* — The Ollila Law Group LLC (57) ABSTRACT

A multiple-stage fluid operated actuator (100) is provided. The multiple-stage fluid operated actuator (100) comprises a housing (101) including a first bore (212) with a first cross-sectional area and a second bore (215) with a second cross-sectional area. The multiple-stage fluid operated actuator (100) further comprises a piston assembly (210) including a first piston (210a) movable within the first bore (212) and a second piston (210b) movable within the first and second bores (212, 215). The piston assembly (210) separates the first and second bores (212, 215) into a first fluid chamber (214a) selectively in fluid communication with a pressurized fluid source (220) or an exhaust, an airtight second fluid chamber (214b), and a third fluid chamber (214c) selectively in fluid communication with the pressurized fluid source (220) or the exhaust.

13 Claims, 5 Drawing Sheets

(58) Field of Classification Search
CPC ...... F15B 15/17; F15B 15/14; F15B 15/1476; F01B 7/18
USPC ...... 425/182, 529, 535, 525; 92/134, 62, 52, 92/13.3; 91/415, 167 R
See application file for complete search history.

(56) References Cited

U.S. PATENT DOCUMENTS

| | | | | |
|---|---|---|---|---|
| 5,140,894 | A * | 8/1992 | Snyder | F16K 31/122 91/4 R |
| 5,188,016 | A | 2/1993 | Tung | |
| 5,586,482 | A | 12/1996 | Leonard | |
| 5,775,363 | A | 7/1998 | Hammond | |
| 5,816,131 | A * | 10/1998 | Tornatore | F15B 11/123 91/169 |
| 5,823,513 | A * | 10/1998 | Stenquist | F16F 9/0218 267/64.26 |
| 6,725,876 | B2 | 4/2004 | Bowman | F02C 7/232 137/312 |
| 7,824,166 | B2 * | 11/2010 | Mie | B29C 49/58 425/182 |
| 7,862,327 | B2 | 1/2011 | Rousseau et al. | |
| 8,202,076 | B2 * | 6/2012 | Parrinello | B29C 43/08 264/318 |
| 8,381,777 | B2 * | 2/2013 | Lupi | B67C 3/2617 141/144 |
| 2004/0265416 | A1 * | 12/2004 | Woods | B29C 49/58 425/535 |
| 2006/0169132 | A1 * | 8/2006 | Tucker | F15B 15/14 92/8 |
| 2006/0279046 | A1 | 12/2006 | Vogt et al. | |
| 2007/0068754 | A1 * | 3/2007 | Furgala | F15B 1/024 188/322.21 |
| 2008/0047381 | A1 * | 2/2008 | Cronin | F16H 61/30 74/335 |
| 2009/0175976 | A1 * | 7/2009 | Parrinello | B29C 43/08 425/150 |
| 2010/0316757 | A1 * | 12/2010 | Rymann | B29C 49/58 425/529 |

FOREIGN PATENT DOCUMENTS

| | | |
|---|---|---|
| CN | 201412411 Y | 2/2010 |
| CN | 101707950 A | 5/2010 |
| CN | 201554719 U | 8/2010 |
| CN | 201588834 U | 9/2010 |
| DE | 102007012040 A1 | 9/2008 |
| JP | 112211 A | 1/1999 |
| JP | 2004011855 A | 1/2004 |
| WO | 2009010024 A3 | 1/2009 |

* cited by examiner

MULTIPLE-STAGED FLUID OPERATED ACTUATOR

TECHNICAL FIELD

The embodiments discussed below relate to, fluid operated actuators, and more particularly, to a multiple-stage fluid operated actuator with a multiple-piece piston assembly.

BACKGROUND OF THE INVENTION

Fluid operated actuators are generally known in the art. Fluid operated actuators convert a fluid pressure to a work piece using an actuator that typically consists of a piston in a cylinder. A piston rod coupled to the piston typically acts on the work piece to perform some task. Although there are various suitable fluids that may be used, the fluid applied to the actuator generally comprises pneumatic or hydraulic fluid, for example. One particular application for fluid operated actuators is in blow molding systems.

Blow molding is a generally known process for molding a preform part into a desired product. The preform is in the general shape of a tube with an opening at one end for the introduction of pressurized gas, typically air; however, other gases may be used. One specific type of blow molding is stretch blow molding (SBM). In a typical SBM application, a valve block provides both low and high-pressure gas to expand the preform into a mold cavity. The mold cavity comprises the outer shape of the desired product. SBM can be used in a wide variety of applications; however, one of the most widely used applications is in the production of Polyethylene terephthalate (PET) products, such as drinking bottles. Typically, the SBM process uses a low-pressure fluid supply in combination with a stretch rod that is inserted into the preform to stretch the preform in a longitudinal direction and radially outward and then uses a high-pressure fluid supply to expand the preform into the mold cavity. The low-pressure and high-pressure supply can be controlled using one or more blow-molding valves. The resulting product is generally hollow with an exterior shape conforming to the shape of the mold cavity. The gas in the preform is then exhausted through one or more exhaust valves. This process is repeated during each blow-molding cycle.

With each blow-molding cycle, a blowing cylinder (also known as a capping cylinder) extends a nozzle towards the preform in order to form a fluid-tight seal with the preform and/or the mold cavity. Because of the extremely high pressures encountered in blow molding systems, it is important that the nozzle can be positioned in an accurate and repeatable manner. Prior art blowing cylinders typically provide a relatively large piston head in order to increase the speed at which the nozzle can be lowered for a given actuating pressure. The problem with this approach is that as the piston head size increases, the system is faced with an increasingly difficult task of maintaining concentricity (centering the piston within the bore) as the piston and nozzle are lowered onto the preform. In addition, these prior art approaches can result in premature damaging of the nozzle, the preform, or both as the nozzle impacts the preform with a relatively high amount of force due to the increased speed of travel. Prior art approaches have not satisfactorily developed a way to cushion the impact as the nozzle is lowered onto the preform.

The embodiments described below overcome these and other problems and an advance in the art is achieved. The embodiments provide a multiple-stage fluid operated actuator with a multiple-piece piston assembly. In some embodiments, the fluid operated actuator comprises a blowing cylinder assembly for a blow molding system with a multiple-piece piston assembly. The multiple-piece piston assembly is capable of maintaining an increased degree of concentricity while simultaneously cushioning the impact of the nozzle as it reaches the end of travel to contact the preform and/or the blowing cavity.

SUMMARY OF THE INVENTION

A multiple-stage fluid operated actuator is provided according to an embodiment. The multiple-stage fluid operated actuator comprises a housing including a first bore with a first cross-sectional area and a second bore with a second cross-sectional area and a piston assembly. According to an embodiment, the piston assembly includes a first piston movable within the first bore and a second piston movable within the first and second bores. According to an embodiment, the piston assembly separates the first and second bores into a first fluid chamber selectively in fluid communication with a pressurized fluid source or an exhaust; an airtight second fluid chamber; and a third fluid chamber selectively in fluid communication with the pressurized fluid source or the exhaust.

A method for operating a multiple-stage fluid operated actuator is provided according to an embodiment. According to an embodiment, the multiple-stage fluid operated actuator comprises a housing including a first bore with a first cross-sectional area and a second bore with a second cross-sectional area, a piston assembly including a first piston movable within the first bore and a second piston movable within the first and second bores, the first and second bores being separated into a first fluid chamber, an airtight second fluid chamber, and a third fluid chamber. According to an embodiment, the method comprises steps of pressurizing the first fluid chamber and exhausting the third fluid chamber while preventing fluid from entering or exiting the airtight second fluid chamber to actuate the first and second, pistons from a first position to a second position. According to an embodiment, the method further comprises a step of pressurizing a fluid channel formed in the first piston in fluid communication with the first fluid chamber and the second piston to actuate the second piston from the second position to a third position while preventing the first piston from moving to the third position.

ASPECTS

According to an aspect, an apparatus comprises:
a housing including a first bore with a first cross-sectional area and a second bore with a second cross-sectional area;
a piston assembly including:
 a first piston movable within the first bore;
 a second piston movable within the first and second bores;
wherein the piston assembly separates the first and second bores into:
 a first fluid chamber selectively in fluid communication with a pressurized fluid source or an exhaust;
 an airtight second fluid chamber; and
 a third fluid chamber selectively in fluid communication with the pressurized fluid source or the exhaust.
Preferably, the apparatus further comprises a piston-receiving aperture formed in the first piston for receiving at least a portion of the second piston.

Preferably, the apparatus further comprises a position control valve coupled to the housing and selectively providing a fluid communication path between the pressurized fluid source and the first fluid chamber or the third fluid chamber.

Preferably, the first fluid chamber is defined at least in part by the first bore and the first piston; the airtight second fluid chamber is defined at least in part by the first and second bores, the first piston, and the second piston; and the third fluid chamber is defined at least in part by the second bore and the second piston.

Preferably, the apparatus further comprises a nozzle extending from the housing, coupled to the piston assembly and movable within a nozzle bore formed in the housing.

Preferably, the apparatus further comprises a blowing valve block coupled to the housing and including one or more blowing valves in fluid communication with the nozzle.

Preferably, the apparatus further comprises a stretch rod extending through the piston assembly and the nozzle.

Preferably, the apparatus further comprises a double sealing arrangement positioned between the second bore and the nozzle bore including a first seal exposed to the second bore and a second seal exposed to the nozzle bore.

Preferably, the apparatus further comprises a vent port located between the first and second seals.

According to another aspect, a method for operating a multiple-stage fluid operated actuator comprising a housing including a first bore with a first cross-sectional area and a second bore with a second cross-sectional area, a piston assembly including a first piston movable within the first bore and a second piston movable within the first and second bores, the first and second bores being separated into a first fluid chamber, an airtight second fluid chamber, and a third fluid chamber comprises steps of:
pressurizing the first fluid chamber;
exhausting the third fluid chamber while preventing fluid from entering or exiting the airtight second fluid chamber to actuate the first and second pistons from a first position to a second position; and
pressurizing a fluid channel formed in the first piston in fluid communication with the first fluid chamber and the second piston to actuate the second piston from the second position to a third position while preventing the first piston from moving to the third position.

Preferably, the step of actuating the first and second pistons from the first position to the second position increases a pressure in the airtight second fluid chamber by decreasing the volume of the airtight second fluid chamber.

Preferably, the multiple-stage fluid operated actuator further includes a nozzle coupled to the piston assembly and wherein the method further comprises a step of supplying pressurized fluid to the nozzle once the second piston has reached the third position.

Preferably, supplying pressurized fluid to the nozzle comprises actuating one or more blowing valves of a blowing valve block coupled to the housing.

Preferably, the method further comprises a step of actuating a stretch rod extending through the first and second pistons and the nozzle.

Preferably, the method further comprises steps of:
pressurizing the third fluid chamber; and
exhausting the first fluid chamber to actuate the piston assembly from the third position to the first position.

DETAILED DESCRIPTION OF THE INVENTION

FIGS. 1-5 and the following description depict specific examples to teach those skilled in the art how to make and use the best mode of embodiments of a fluid operated actuator. For the purpose of teaching inventive principles, some conventional aspects have been simplified or omitted. Those skilled in the art will appreciate variations from these examples that fall within the scope of the present description. Those skilled in the art will appreciate that the features described below can be combined in various ways to form multiple variations of the fluid operated actuator. As a result, the fluid operated actuator is not limited to the specific examples described below, but only by the claims and their equivalents.

Figure 1:
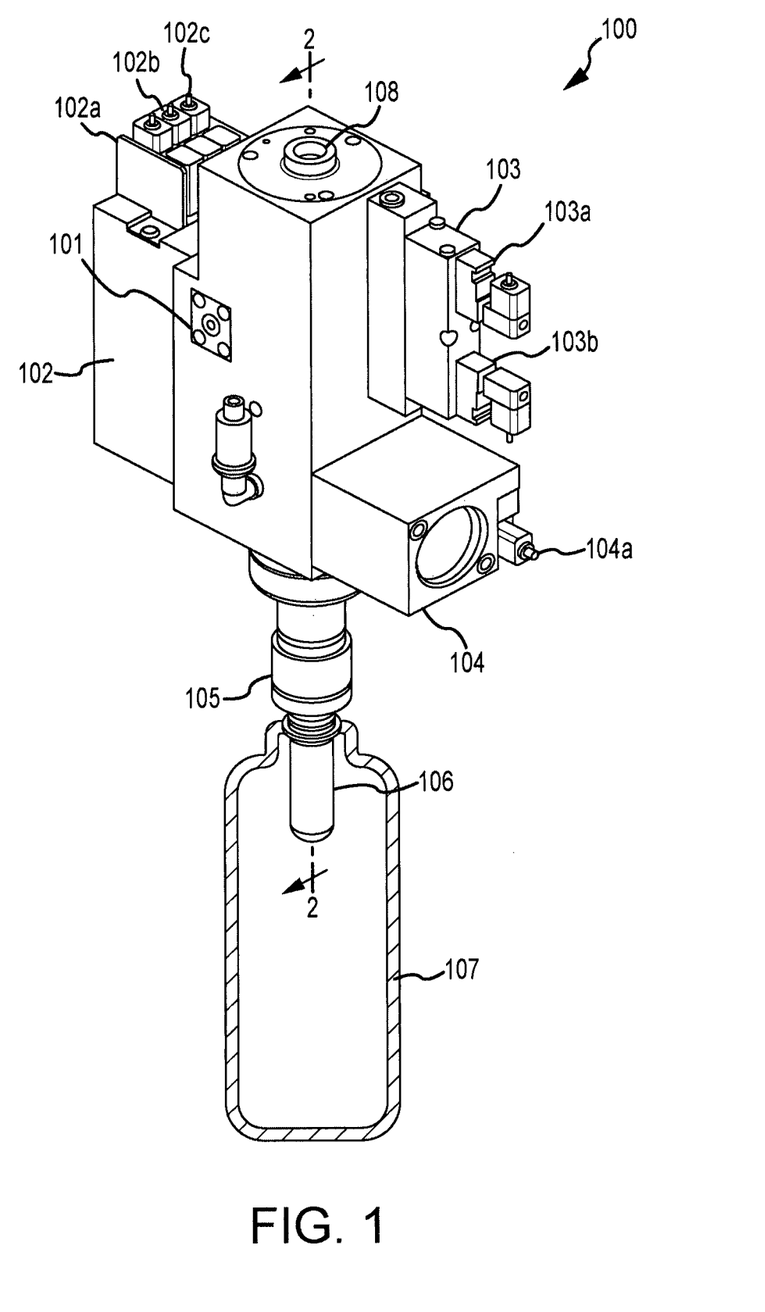
FIG. 1 shows a blowing cylinder assembly according to an embodiment.

FIG. 1 shows a fluid operated actuator 100 according to an embodiment. In the embodiment shown in FIGS. 1-4, the fluid operated actuator comprises a blowing cylinder assembly 100, and is referred to as such. However, it should be appreciated that the blowing cylinder assembly 100 is merely one exemplary application for the fluid operated actuator 100 and therefore, the present embodiment should not be limited to using the fluid operated actuator 100 as a blowing cylinder assembly 100, see FIG. 5 and the accompanying discussion, for example.

The blowing cylinder assembly 100 comprises a housing 101, a blowing valve block 102 coupled to the housing 101 with first, second, and third pilot valves 102a, 102b, 102c, a position control valve 103 with first and second pilot valves 103a, 103b, and an air recovery valve 104 with an associated pilot valve 104a. Extending from the housing 101 is a nozzle 105, which is shown in a fluid-tight arrangement with a preform 106. The nozzle 105 can provide pressurized gas to the preform 106 during the molding operation. The preform 106 is shown prior to being molded. The preform 106 is shown located within a mold cavity 107. As can be appreciated, as the preform 106 is molded, it takes the general shape of the mold cavity 107. Depending on the particular configuration of the blowing nozzle 105, the blowing nozzle 105 may form a substantially fluid-tight seal with the preform 106, the mold cavity 107, or both.

Also shown in FIG. 1 is a portion of a stretch rod 108. The stretch rod 108 may be provided in situations where the blowing cylinder assembly 100 is part of a stretch blow molding (SBM) system. The stretch rod 108 may be further coupled to a stretch rod control assembly (not shown) that can control the position of the stretch rod 108 and/or provide a cooling gas to the molded product at the end of the blowing phase. Such systems are generally known in the art and a detailed discussion of the control of the stretch rod 108 is not important for the purposes of the present description.

According to an embodiment, the position control valve 103 is actuated in order to lower the nozzle 105 into a blowing position where the nozzle 105 forms a substantially fluid-tight seal with the preform 106, the mold cavity 107, or both. Once the nozzle 105 is in a blowing position, the blowing valve block 102 can be actuated to provide a pressurized gas to the nozzle 105 in order to mold the preform 106 into the desired product. In many embodiments, the blowing valve block 102 will actuate a first valve during a pre-blowing phase where the preform is stretched longitudinally and radially outward. This phase may be accompanied by an extension of the stretch rod 108 into the preform to assist in the longitudinal stretching. The pressure provided to the preform during the pre-blowing phase is typically around 20 bar (290 psi); however, other pressures may be used. During a blowing stage, the blowing valve block 102 actuates a second valve to pressurize the preform 106 to a higher pressure, typically around 40 bar (580 psi). During the blowing phase, the preform 106 is expanded into the mold cavity 107 to take on the general shape of the mold cavity 107. After the preform 106 is molded into the desired product, the pressure in the cavity 107 is exhausted. In some embodiments, this is first accomplished using the recovery valve 104 where some of the pressurized gas is recycled. The blowing valve block 102 can then use a third exhaust valve to exhaust the remaining pressurized fluid from the system. With the molded product exhausted, the position control valve 103 can be actuated to retract the nozzle 105 from the cavity 107 in preparation for the next molding cycle. As an optional step, cooling gas may be supplied through the stretch rod 108 to speed the cooling of the molded product.

Figure 2:
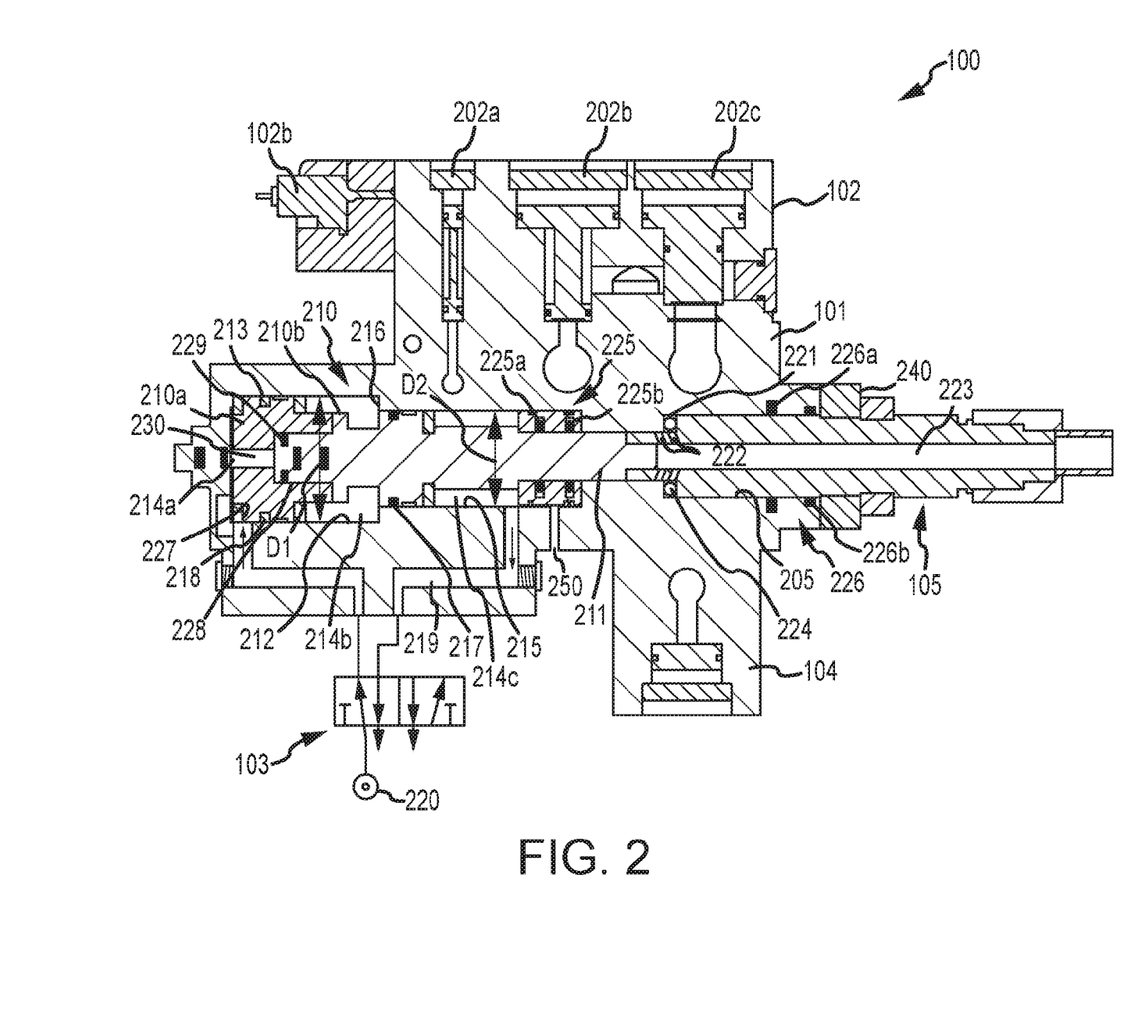
FIG. 2 shows a cross-sectional view of the blowing cylinder assembly according to an embodiment.

FIG. 2 shows a cross-sectional view of the blowing cylinder assembly 100 taken along line 2-2 of FIG. 1. In the embodiment shown in FIG. 2, the preform 106 and the mold cavity 107 are omitted in order to simplify the drawing. Furthermore, in the position shown in FIG. 2, the nozzle 105 is retracted and therefore, is not in contact with the preform 106. According to the embodiment shown in FIG. 2, the blowing cylinder assembly 100 is shown without the stretch rod 108. Therefore, it should be appreciated that the blowing cylinder assembly 100 is not limited to embodiments including a stretch rod.

As can be seen in FIG. 2, the nozzle 105 extends at least partially into the housing 101. The nozzle 105 can be movable within the housing 101. More particularly, the nozzle 105 can be movable within a nozzle bore 205 formed in the housing 101. In the position shown in FIG. 2, the nozzle 105 is in a retracted position. According to an embodiment, in the retracted position, a sleeve 240 or some other type of stop, such as a threaded nut, coupled to the nozzle 105 can contact the housing 101 to prevent further movement of the nozzle 105 to the left, i.e., retracted into the housing 101.

According to an embodiment, the nozzle 105 can be coupled to a multiple-piece piston assembly 210. The piston assembly 210 is shown separated into a two-piece assembly, thereby providing the blowing cylinder assembly 100 with a multiple-stage actuation. According to an embodiment, the piston assembly 210 comprises a first piston 210a and a second piston 210b. While only two pistons 210a, 210b are shown, it should be appreciated that in other embodiments, the piston assembly 210 may comprise more than two pistons. According to an embodiment, a piston rod 211 extends from the second piston 210b and couples the nozzle 105. The piston rod 211 and the nozzle 105 may be coupled using known techniques such as, mechanical fasteners, screw threads, adhesives, brazing, bonding, etc. The particular method used for coupling the nozzle 105 and the piston rod 211 is not important, and should in no way limit the scope of the present embodiment. While the piston assembly 210 can be formed from any suitable material, in one embodiment, the piston assembly 210 can be formed from a plastic or polymer, such as PET in order to provide a lighter piston assembly 210 compared to metal, for example.

According to an embodiment, the first piston 210a of the piston assembly 210 is movable within the housing 101. More specifically, the first piston 210a is movable within a first piston bore 212 formed in the housing 101. According to an embodiment, the first piston bore 212 comprises a diameter $D_1$. The first piston 210a can include one or more sealing members 213, which form a substantially fluid-tight seal with the first piston bore 212.

According to an embodiment, the second piston 210b is also movable within the housing 101. According to the embodiment shown, the second piston 210b is movable within the first bore 212 and a second bore 215 formed in the housing 101. In the embodiment shown, the second bore 215 comprises a second diameter $D_2$. According to an embodiment, the second diameter $D_2$ is less than the first diameter $D_1$. As shown, a shoulder 216 is provided at the junction of the first and second bores 212, 215. The shoulder 216 can provide the transition from the first diameter $D_1$ to the second diameter $D_2$.

According to an embodiment, at least a portion of the second piston 210b can be received in a piston-receiving aperture 228 formed in the first piston 210a. However, it should be appreciated that in other embodiments, the second piston 210b may simply contact the first piston 210a without entering a portion of the first piston 210a. In either embodiment, the second piston 210b can be movable with respect to the first and second bores 212, 215 as well as the first piston 210a. In embodiments where a portion of the second piston 210b is received by the first piston 210a, the second piston 210b can include a sealing member 229 that forms a substantially fluid-tight seal between the piston-receiving aperture 228 and the portion of the second piston 210b received by the piston-receiving aperture 228.

According to an embodiment, the piston assembly 210 can separate the first and second bores 212, 215 into a first 214a, a second 214b, and a third 214c fluid chamber. According to an embodiment, the first fluid chamber 214a is defined at least in part by the first bore 212 and the first piston 210a. According to an embodiment, the airtight second fluid chamber 214b is defined at least in part by the first and second bores 212, 215, the first piston 210a, and the second piston 210b. In embodiments where a portion of the second piston 210b is received by the piston-receiving aperture 228, the airtight second fluid chamber 214b is defined at least in part by the first and second bores 212, 215, the first piston 210a, and the portion of the second piston 210b not received by the piston-receiving aperture 228, i.e., the portion of the second piston 210b extending from the first piston 210a. According to an embodiment, the third fluid chamber 214c is defined at least in part by the second bore 215 and the second piston 210b. As can be appreciated, the sealing member 213 of the first piston 210a separates the first fluid chamber 214a and the airtight second fluid chamber 214b. In addition, the sealing member 229 can further prevent pressurized fluid in the first fluid chamber 214a from reaching the airtight second fluid chamber 214b. Therefore, the sealing members 213, 229 can substantially prevent fluid that is in the first chamber 214a from reaching the second chamber 214b. According to an embodiment, one or more sealing members 217 of the second piston 210b can separate the airtight second fluid chamber 214b from the third fluid chamber 214c. Advantageously, fluid supplied to the third chamber 214c is substantially sealed off from the second chamber 214b.

According to an embodiment, the position control valve 103 is in fluid communication with the first and third chambers 214a, 214c via fluid lines 218, 219, respectively. While the fluid lines 218, 219 are shown extending external from the housing 101, it should be appreciated that, as shown in FIG. 1, in some embodiments, the position control valve 103 can be coupled to the housing 101, thereby eliminating the need for external fluid lines extending from the position control valve 103 to the housing 101.

In the embodiment shown, the position control valve 103 comprises a 5/2-way valve; however, those skilled in the art will readily appreciate that other types of valves may be used while remaining within the scope of the present embodiment. For example, the position control valve 103 may comprise a 5/3-way valve. Therefore, the particular type of valve used should in no way limit the scope of the present embodiment. According to an embodiment, the position control valve 103 can be actuated using one or more pilot valves 103a, 103b shown in FIG. 1. However, in other embodiments, the position control valve 103 may be electrically actuated, such as by using solenoids, piezo-electric elements, SMA elements, etc. The particular method used to actuate the position control valve 103 is not important for purposes of the present embodiment and therefore, should in no way limit the scope of the present embodiment.

According to an embodiment, when the position control valve 103 is actuated to a first position, the first fluid chamber 214a is selectively brought into fluid communication with a pressurized fluid source 220 while the third fluid chamber 214c is exhausted. Conversely, when the position control valve 103 is actuated to a second position, the third fluid chamber 214c is selectively brought into fluid communication with the pressurized fluid source 220 while the first fluid chamber 214a is exhausted. The pressurized fluid source 220 may provide a pressurized gas or a pressurized liquid. Therefore, the particular type of fluid supplied should not limit the scope of the present embodiment. According to an embodiment, the second fluid chamber 214b is neither in fluid communication with the pressurized fluid source 220 nor exhausted. Rather, the second fluid chamber 214b comprises an airtight chamber. According to an embodiment, the airtight chamber 215b does not permit fluid to enter or leave. Rather, the airtight chamber 215b comprises a predetermined mass of fluid that remains substantially constant. It should be appreciated that the fluid contained within the airtight chamber 215b may comprise a gas or a liquid. For example, the airtight chamber 215b may comprise air or hydraulic fluid, for example. The airtight second fluid chamber 220b is discussed in more detail below.

Also shown in FIG. 2 is the blowing valve block 102. According to an embodiment, the blowing valve block 102 is coupled to the housing 101. Like the position control valve 103, coupling the blowing valve block 102 to the housing 101 eliminates the need for external hoses or fluid lines, thereby substantially decreasing the dead volume for each molding cycle. The blowing valve block 102 is shown as comprising three valves; however, any number of valves may be provided. In the embodiment shown, the blowing valve block 102 comprises a first valve 202a, a second valve 202b, and a third valve 202c. According to an embodiment, the first valve 202a is used during the pre-blowing phase, the second valve 202b is used during the blowing phase, and the third valve 202c is used during the exhausting phase. According to an embodiment, the three valves 202a-202c are in fluid communication with the nozzle 105 via a fluid port 221 formed in the housing 101, and more particularly in the nozzle bore 205. Furthermore, the nozzle 105 includes one or more cross-bores 222 that provide fluid communication with the internal blowing bore 223 formed in the nozzle 105. According to an embodiment, the nozzle bore 205 further comprises a second fluid port 224 that provides a fluid communication path to the recovery valve 104, in embodiments including the recovery valve 104. The various internal fluid passages between the blowing valves 202a-202c and the recovery valve 104 and the fluid ports 221, 224 are not shown in the figures in order to simplify the drawings. However, those skilled in the art will readily recognize suitable passageways that can be formed using known techniques. The particular passageways and methods for machining the passageways are not important for the purposes of the present description and therefore, a detailed discussion is omitted for brevity of the description.

According to an embodiment, the blowing cylinder assembly 100 further comprises a sealing arrangement 225 for providing a substantially fluid-tight seal between the third fluid chamber 214c and the nozzle bore 205. In the embodiment shown, the sealing arrangement 225 comprises a double sealing arrangement with a first and a second seal 225a, 225b. As shown, the first seal 225a is exposed to the third fluid chamber 214c while the second seal 225b is exposed to the nozzle bore 205. The double sealing arrangement 225 improves the separation between the relatively low pressures in the third fluid chamber 214c used to actuate the piston assembly 210, for example around 6 bar (87 psi), and the relatively high pressure in the nozzle bore 205, used to mold the preform, for example around 40 bar (580 psi). In some embodiments, a vent port 250 may be provided between the two seals 225a, 225b in order to prevent pressure that escapes past either seal from creating a pressure buildup and adversely affecting the sealing function of the seals. The vent port 250 may be exposed to the atmosphere, for example.

According to an embodiment, the blowing cylinder assembly 100 can further include a second sealing arrangement 226 to provide a substantially fluid-tight seal between the nozzle bore 205 and the atmosphere. In the embodiment shown, the second sealing arrangement 226 comprises first and second seals 226a, 226b. The first and second seals 226a, 226b of the second sealing arrangement 226 can provide a fluid-tight seal with the nozzle 105. While two seals are shown, it should be appreciated that the second sealing arrangement 226 may comprise any number of desired seals and the present embodiment should not be limited to requiring a double sealing arrangement as shown.

Operation of the blowing cylinder assembly 100 according to an embodiment will now be described. As mentioned above, FIG. 2 shows the piston assembly 210 in a first (retracted) position. According to an embodiment, in the retracted position, the first piston 210a is in a first position and abutting a shoulder 227 formed in the first fluid chamber 214a. The shoulder 227 can provide a stop for the piston assembly 210 to prevent further movement to the left. It should be appreciated that in other embodiments, the shoulder 227 may be formed on the first piston 210a rather than in the first bore 212. According to an embodiment, the sleeve 240 coupled to the nozzle 105 may also abut the housing 101 to provide a positive stop for the piston assembly 210 due to the coupling between the nozzle 105 and the piston assembly 210. Furthermore, in the embodiment shown, the second piston 210b is received by the piston-receiving aperture 228 formed in the first piston 210a when the piston assembly 210 is in the retracted position. The piston-receiving aperture 228 can receive at least a portion of the second piston 210b. As mentioned above, the second piston 210b can include one or more sealing members 229 for forming a substantially fluid-tight seal between the piston-receiving aperture 228 and the second piston 210b. The first piston 210a further includes a fluid channel 230 that provides a fluid communication path between the first fluid chamber 214a and the piston-receiving aperture 228.

Figure 3:
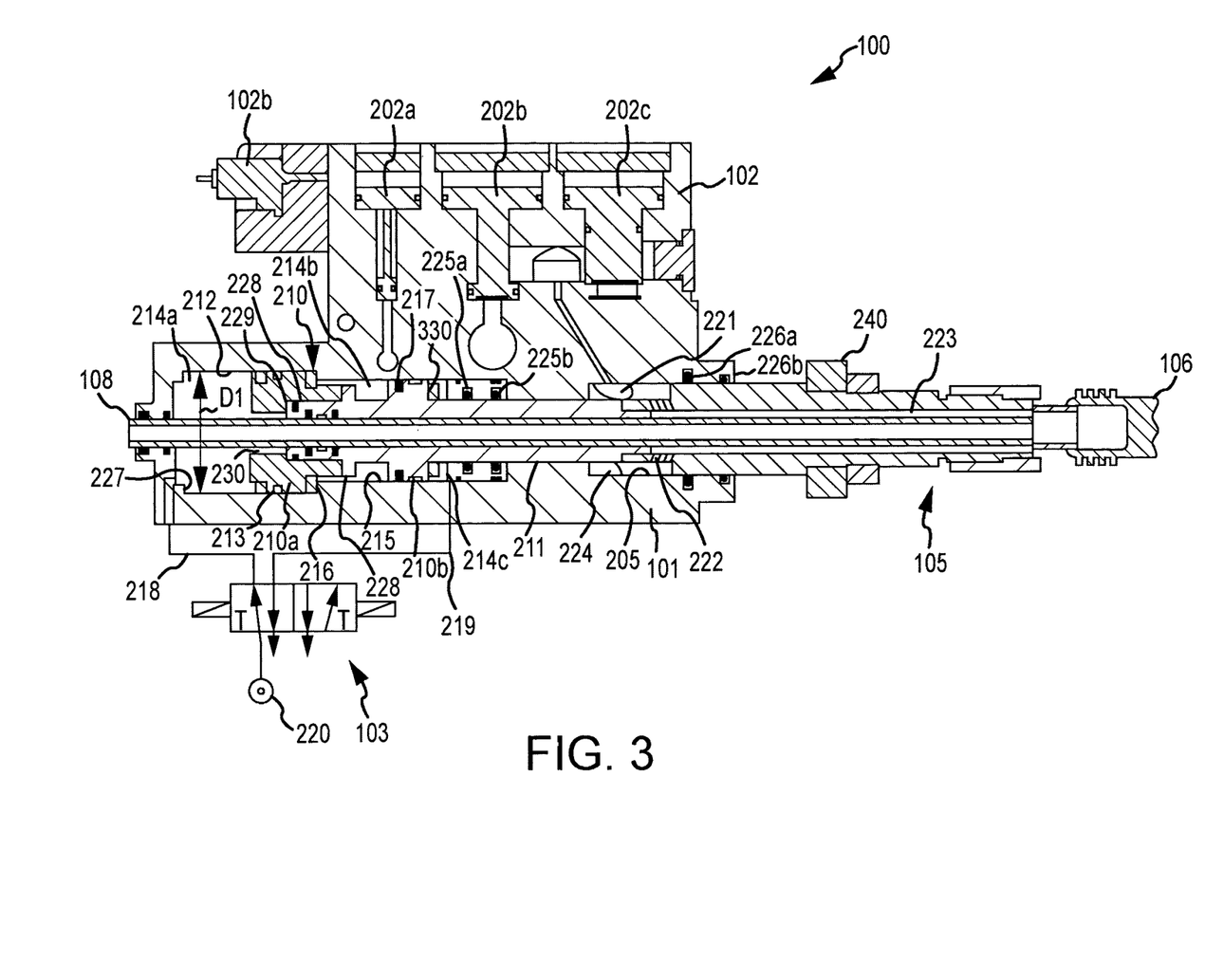
FIG. 3 shows a cross-sectional view of the blowing cylinder assembly according to another embodiment.

FIG. 3 shows the blowing cylinder assembly 100 with the piston assembly 210 actuated from the first position shown in FIG. 2 to a second position. In FIG. 3, the recovery valve 104 has been omitted in order to simplify the drawing. However, the stretch rod 108 is now shown. As shown, the stretch rod 108 extends through the piston assembly 210 as well as the nozzle 105.

According to an embodiment, with the position control valve 103 actuated to the first position, the first fluid chamber 214a is selectively brought into fluid communication with the pressurized fluid source 220 while the third fluid chamber 214c is exhausted. With pressurized fluid supplied to the first fluid chamber 214a, the piston assembly 210 is moved from the first position to a second position. According to one embodiment, the piston assembly 210 moves approximately 36 mm (1.4 inches) during movement from the first position to the second position. With the first fluid chamber 214a being pressurized, the pressurized fluid acts on the first piston 210a to bias the first piston 210a to the right as shown. According to an embodiment, the first piston 210a can also push the second piston 210b to a second position. In addition to the mechanical biasing force on the second piston 210b due to the movement of the first piston 210a, the pressurized fluid in the first fluid chamber 214a also acts on the second piston 210b through the fluid channel 230. Therefore, the second piston 210b can be biased to the second position by both the mechanical biasing force between the first and second pistons 210a, 210b and/or the pressurized fluid acting on the second piston 210b.

As can be appreciated, with at least a portion of the second piston 210b received in the piston-receiving aperture 228, the pressurized fluid acts on the piston assembly 210 across substantially the entire diameter $D_1$ of the first bore 212. Therefore, in moving the piston assembly 210 from the first position to the second position, the pressurized fluid provides a first biasing force (Pressure*cross-sectional area provided by $D_1$).

According to an embodiment, in the second position, the piston assembly 210 has extended the nozzle 105 towards the preform 106 by a predetermined amount. While a portion of the nozzle 105 is inserted into the preform 106, the nozzle 105 has not yet made a fluid-tight coupling with the preform 106.

During actuation of the piston assembly 210 towards the second position, the third fluid chamber 214c is exhausted. However, because the second fluid chamber 214b comprises an airtight chamber, it is substantially closed off from both the pressurized fluid source 220 and the exhaust. In other words, fluid neither enters nor exits the airtight second fluid chamber 214b. The sealing members 213, 217, 229 substantially prevent fluid from entering or exiting the airtight second fluid chamber 214b. As the piston assembly 210 is actuated towards the second position, the volume of the airtight second fluid chamber 214b decreases. The decrease in volume is mainly due to the smaller diameter $D_2$ of the second bore 215. As can be seen in FIG. 3, when the piston assembly 210 is actuated towards the second position, a greater portion of the airtight second fluid chamber 214b is shifted into the second bore 215. Due to the substantially constant amount of fluid in the airtight second fluid chamber 214b, the pressure in the airtight second fluid chamber 214b increases. The increase in pressure in the airtight second fluid chamber 214b partially counters the biasing force acting on the piston assembly 210 due to the pressurized fluid in the first fluid chamber 214a to create a cushion or braking action as the nozzle 105 is being actuated towards the preform 106. Therefore, the nozzle 105 does not impact the preform 106 with the high speeds experienced by prior art systems. Furthermore, for a substantially constant pressure supplied to the first fluid chamber 214a, the actuation speed of the piston assembly 210 will decrease as the piston assembly 210 moves closer to the second position as the pressure in the airtight second fluid chamber 214b increases.

Figure 4:
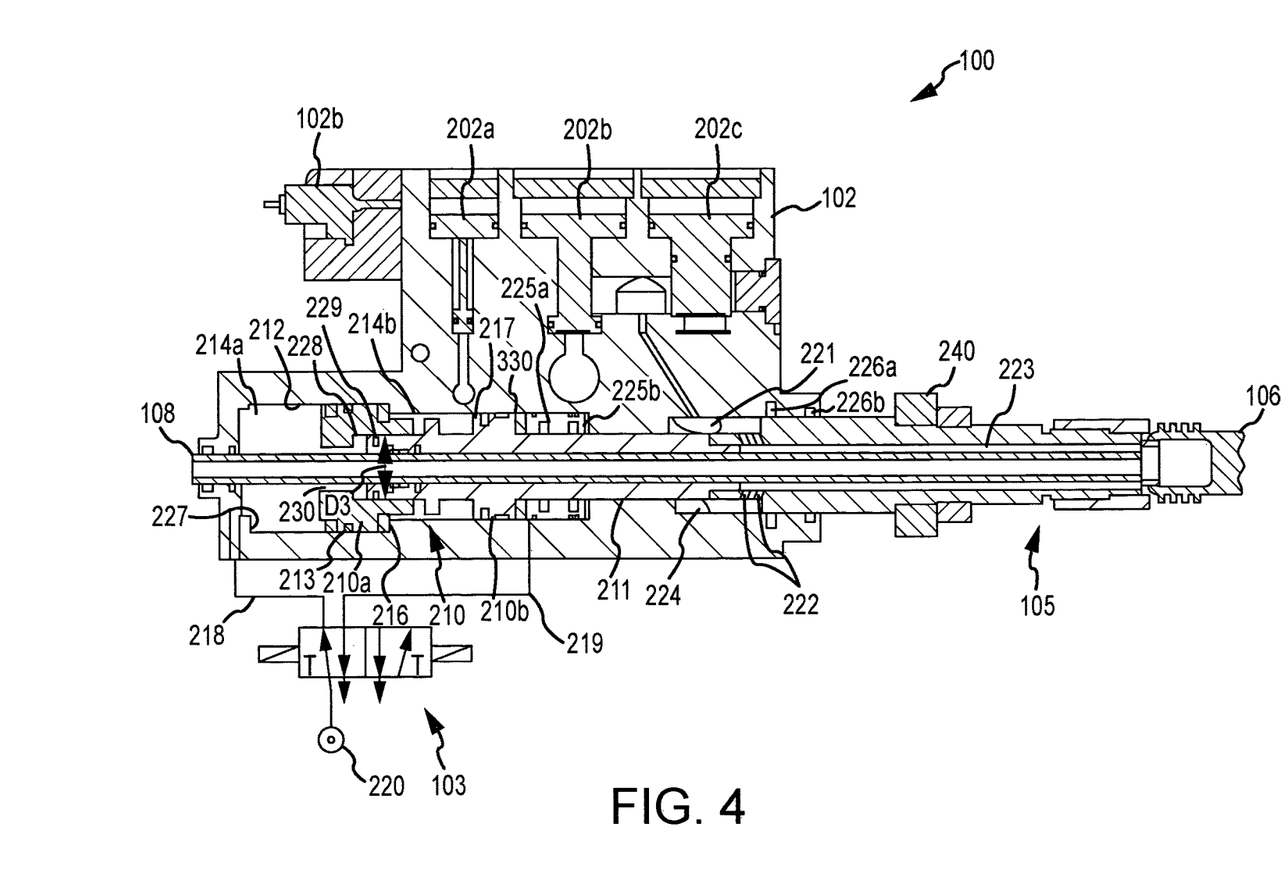
FIG. 4 shows a cross-sectional view of the blowing cylinder assembly according to yet another embodiment.

FIG. 4 shows a cross-sectional view of the blowing cylinder assembly 100 according to another embodiment. In the embodiment shown in FIG. 4, the piston assembly 210 has moved from the second position (FIG. 3) to a third position. The piston assembly 210 has moved to the third position due to the continued supply of pressurized fluid to the first fluid chamber 214a. According to an embodiment, the piston assembly 210 moves approximately 5 mm (0.2 inches) when moving from the second position to the third position. More specifically, the first piston 210a remains substantially stationary while the second piston 210b moves to the third position.

As shown in FIGS. 3 & 4, at the second position, the first piston 210a abuts the shoulder 216 located at the junction of the first and second bores 212, 215. Consequently, once the first piston 210a reaches the shoulder 216, the first piston 210a cannot travel any further to the right. However, with pressurized fluid still being supplied to the first fluid chamber 214a, the second piston 210b is still biased by pressurized fluid through the fluid channel 230 formed in the first piston 210a. The pressurized fluid therefore biases the second piston 210b to the third position where the second piston 210b extends at least partially from the piston-receiving aperture 228 formed in the first piston 210a. The second piston 210b stops moving as the shoulder 330 reaches the sealing arrangement comprising the seals 225a, 225b. In other embodiments, the second piston 210b may stop moving due to the nozzle 105 creating a substantially fluid-tight seal between the preform 106 and/or the mold cavity 107.

According to an embodiment, the sealing member 229 maintains the substantially fluid-tight seal between the second piston 210b and the piston-receiving aperture 228 to prevent fluid in the first fluid chamber 214a from leaking into the airtight second fluid chamber 214b. As can be appreciated, as the second piston 210a moves towards the third position relative to the first piston 210a, the pressurized fluid acts on a smaller cross-sectional area. Specifically, the pressurized fluid acts on the cross-sectional area provided by a diameter $D_3$ to provide a second force (Pressure*cross-sectional area provided by diameter $D_3$). The diameter $D_3$ comprises the diameter of the portion of the second piston 210b received in the piston-receiving aperture 228. Alternatively, in embodiments where a portion of the second piston 210b is not received by the first piston 210a, the diameter $D_3$ comprises the diameter of the second piston 210b exposed to the first fluid chamber 214a. According to an embodiment, the diameter $D_3$ is less than the diameter $D_1$. Consequently, the biasing force provided by the pressurized fluid supplied to the first fluid chamber 214a is less during movement from the second position to the third position than the biasing force provided for movement from the first position to the second position. As a result, a first force can be provided to bring the nozzle 105 into contact with the preform 106 and a smaller second force can be used to form the substantially fluid-tight seal with the nozzle 105. This reduction in biasing force can further reduce the risk of damaging the nozzle 105 as it impacts the preform 106.

According to an embodiment, because the second piston 210b has a smaller cross-sectional area than the first piston 210a, and at least a portion received in the piston-receiving aperture 228, maintaining concentricity of the second piston 210b is easier and more reliable than maintaining concentricity of the first piston 210a. Advantageously, sealing the nozzle 105 is improved over prior art designs.

Once the piston assembly 210 has reached the third position, the nozzle 105 forms a substantially fluid-tight seal with the preform 106, the mold cavity 107, or both. With the piston assembly 210 in the third position, the various valves 202a-202c of the blowing valve block 102 can be actuated in order to mold the preform 106 into the desired shape. Further, the stretch rod 108 may be extended as is generally known in the art in order to aid in the molding process.

According to an embodiment, the piston assembly 210 and thus, the nozzle 105 can be retracted back to the first position by actuating the position control valve 103 to a second position. When the position control valve 103 is actuated to the second position, the third fluid chamber 214c is selectively brought into fluid communication with the pressurized fluid source 220 while the first fluid chamber 214a is exhausted. According to an embodiment, the airtight second fluid chamber 214b remains closed off from both the pressurized fluid source and the exhaust.

With the third fluid chamber 214c in fluid communication with the pressurized fluid source 220, the second piston 210b is biased back to the left, i.e., retracted until it reaches the second position. Once, the second piston 210b reaches the second position, the second piston 210b can mechanically bias the first piston 210a back to the first position. Although the drawings show that the first and second pistons 210a, 210b are in direct physical contact, it should be appreciated that physical contact as used in the present description is not limited to direct physical contact and in some embodiments, another component may be located between the first and second pistons 210a, 210b while remaining within the scope of the present embodiment.

Figure 5:
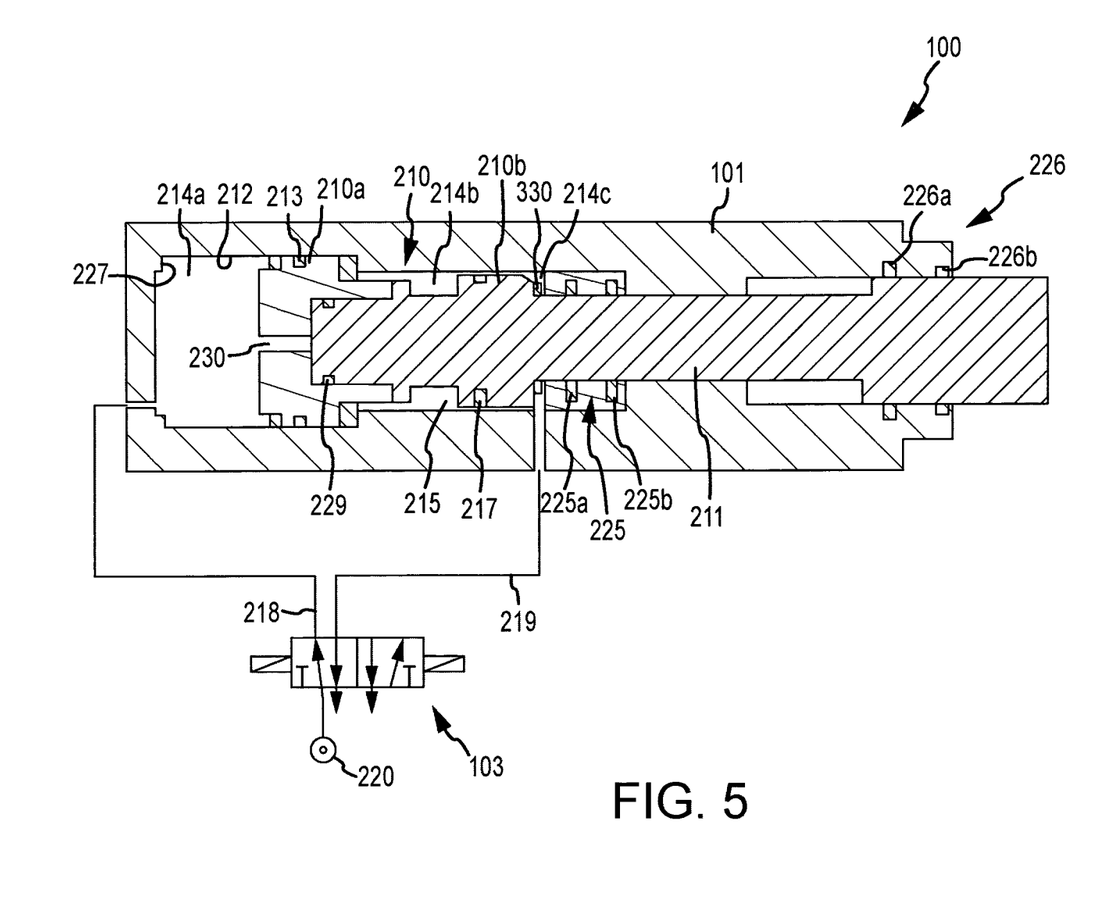
FIG. 5 shows a cross-sectional view of a fluid operated actuator according to an embodiment.

FIG. 5 shows a cross-sectional view of the fluid operated actuator 100 according to another embodiment. In the embodiment shown in FIG. 5, the fluid operated actuator 100 does not comprise a blowing cylinder assembly as described in the discussion of FIGS. 1-4. Rather, the fluid operated actuator 100 could be utilized in other applications where a pressurized fluid supply is delivered to the piston assembly 210 to perform work.

In the embodiment shown in FIG. 5, the piston rod 211 extends out of the housing 101 eliminating the need for the nozzle 105 with the blowing bore 223. Rather, the piston rod 211 may be coupled to the work piece (not shown). Operation of the fluid operated actuator 100 is substantially the same as the fluid operated actuator 100 comprising the blowing cylinder assembly 100 shown in FIGS. 1-4 and discussed above.

The fluid operated actuator as described above provides a multiple-stage fluid operated actuator 100 that is capable of decreasing the impact at the end of its piston assembly 210 stroke, but also improve concentricity of the pistons assembly's movement. The fluid operated actuator 100 of the present embodiment provides a piston assembly 210 including two or more pistons 210a, 210b. During a first stage of actuation, both of the pistons 210a, 210b can be actuated from the first position to the second position. During a second stage of actuation, the second piston 210b can move independently of the first piston 210a to move to the third position. Advantageously, during the second stage of actuation, the force acting on the piston assembly 210 is reduced in order to reduce the risk of damage to the fluid operated actuator 100. Furthermore, as explained above, as the piston assembly 210 is being actuated towards the second position, the pressure in the airtight second fluid chamber 214b increases and acts to counter the movement of the piston assembly 210 in order to cushion the impact as the piston assembly 210 moves.

While the majority of the discussion above describes the multiple-stage fluid operated actuator 100 in the form of a blowing cylinder assembly 100, those skilled in the art will readily recognize that the present embodiment extends beyond blow molding applications. Therefore, while the blowing cylinder assembly 100 comprises a specific example of the multiple-stage fluid operated actuator 100, the present embodiment should not be limited to the blowing cylinder assembly 100.

The detailed descriptions of the above embodiments are not exhaustive descriptions of all embodiments contemplated by the inventors to be within the scope of the fluid operated actuator. Indeed, persons skilled in the art will recognize that certain elements of the above-described embodiments may variously be combined or eliminated to create further embodiments, and such further embodiments fall within the scope and teachings of the present description. It will also be apparent to those of ordinary skill in the art that the above-described embodiments may be combined in whole or in part to create additional embodiments within the scope and teachings of the present description.

Thus, although specific embodiments of, and examples for, the fluid operated actuator are described herein for illustrative purposes, various equivalent modifications are possible within the scope of the present description, as those skilled in the relevant art will recognize. The teachings provided herein can be applied to other fluid operated actuators, and not just to the embodiments described above and shown in the accompanying figures. Accordingly, the scope of the fluid operated actuator should be determined from the following claims.

We claim:

1. A blow molding cylinder assembly (100), comprising:
    a housing (101) including a first bore (212) with a first cross-sectional area and a second bore (215) with a second cross-sectional area;
    a piston assembly (210) including:
        a first piston (210a) having a fluid channel formed therein, wherein the first piston is movable within the first bore (212);
        a second piston (210b) movable within the first and second bores (212, 215);
    wherein the piston assembly (210) separates the first and second bores (212, 215) into:
        a first fluid chamber (214a) selectively in fluid communication with a pressurized fluid source (220) or an exhaust;
        an airtight second fluid chamber (214b);
        a third fluid chamber (214c) selectively in fluid communication with the pressurized fluid source (220) or the exhaust, wherein the third fluid chamber is configured to be exhausted while preventing fluid from entering or exiting the airtight second fluid chamber to actuate the first and second pistons from a first position to a second position;

a blow nozzle (105) extending from the housing (101), coupled to the piston assembly (210) and movable within a nozzle bore (205) formed in the housing (101); and wherein the fluid channel is in fluid communication with the first fluid chamber and the second piston, and is configured to actuate the second piston from the second position to a third position while preventing the first piston from moving to the third position when the fluid channel is pressurized.

2. The blow molding cylinder assembly (100) of claim 1, further comprising a piston-receiving aperture (228) formed in the first piston (210a) for receiving at least a portion of the second piston (210b).

3. The blow molding cylinder assembly (100) of claim 1, further comprising a position control valve (103) coupled to the housing (101) and selectively providing a fluid communication path between the pressurized fluid source (220) and the first fluid chamber (214a) or the third fluid chamber (214c).

4. The blow molding cylinder assembly (100) of claim 1, wherein the first fluid chamber (214a) is defined at least in part by the first bore (212) and the first piston (210a); the airtight second fluid chamber (214b) is defined at least in part by the first and second bores (212, 215), the first piston (210a), and the second piston (210b); and the third fluid chamber (214c) is defined at least in part by the second bore (215) and the second piston (210b).

5. The blow molding cylinder assembly (100) of claim 1, further comprising a blowing valve block (102) coupled to the housing (101) and including one or more blowing valves (202a-202c) in fluid communication with the nozzle (105).

6. The blow molding cylinder assembly (100) of claim 1, further comprising a stretch rod (108) extending through the piston assembly (210) and the nozzle (105).

7. The blow molding cylinder assembly (100) of claim 1, further comprising a double sealing arrangement (225) positioned between the second bore (215) and the nozzle bore (205) including a first seal (225a) exposed to the second bore (215) and a second seal (225b) exposed to the nozzle bore (205).

8. The blow molding cylinder assembly (100) of claim 7, further comprising a vent port (250) located between the first and second seals (225a, 225b).

9. A method for operating a multiple-stage fluid operated actuator comprising a housing including a first bore with a first cross-sectional area and a second bore with a second cross-sectional area, a piston assembly including a first piston movable within the first bore and a second piston movable within the first and second bores, the first and second bores being separated into a first fluid chamber, an airtight second fluid chamber, and a third fluid chamber, wherein the multiple-stage fluid operated actuator further includes a blow nozzle coupled to the piston assembly, the method comprising steps of:

pressurizing the first fluid chamber;

exhausting the third fluid chamber while preventing fluid from entering or exiting the airtight second fluid chamber to actuate the first and second pistons from a first position to a second position;

pressurizing a fluid channel formed in the first piston in fluid communication with the first fluid chamber and the second piston to actuate the second piston from the second position to a third position while preventing the first piston from moving to the third position; and supplying pressurized fluid to the blow nozzle once the second piston has reached the third position.

10. The method of claim 9, wherein the step of actuating the first and second pistons from the first position to the second position increases a pressure in the airtight second fluid chamber by decreasing the volume of the airtight second fluid chamber.

11. The method of claim 9, wherein supplying pressurized fluid to the nozzle comprises actuating one or more blowing valves of a blowing valve block coupled to the housing.

12. The method of claim 9, further comprising a step of actuating a stretch rod extending through the first and second pistons and the nozzle.

13. The method of claim 9, further comprising steps of:

pressurizing the third fluid chamber; and exhausting the first fluid chamber to actuate the piston assembly from the third position to the first position.

* * * * *